Jan. 4, 1966 S. A. HEENAN ETAL 3,227,869
WARNING LIGHT CASING CONSTRUCTION
Filed April 1, 1963
2 Sheets-Sheet 1
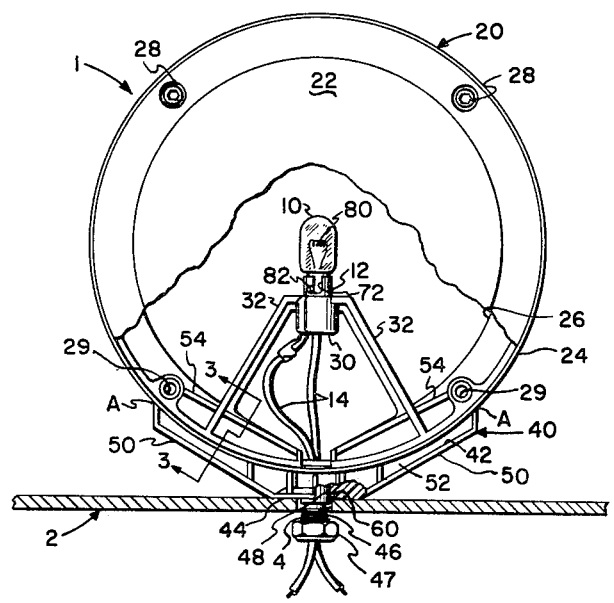
FIG. 1
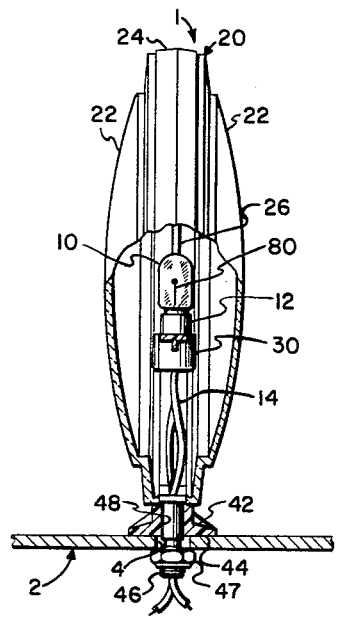
FIG. 4
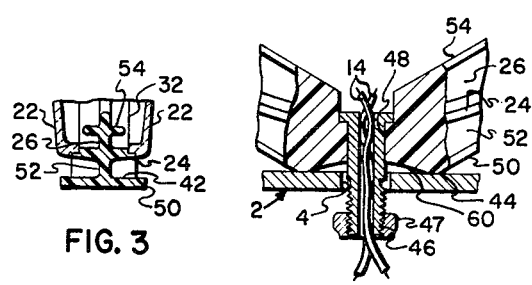
FIG. 3
FIG. 2
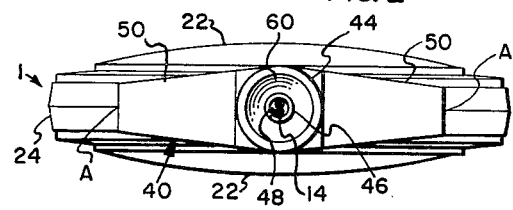
FIG. 5
INVENTORS
SIDNEY A. HEENAN
JOHN A. BIELA
BY Arthur Jacob
ATTORNEY Jan. 4, 1966  S. A. HEENAN ETAL  3,227,869
WARNING LIGHT CASING CONSTRUCTION
Filed April 1, 1963  2 Sheets-Sheet 2

INVENTORS
SIDNEY A. HEENAN
JOHN A. BIELA
BY Arthur Jacob
ATTORNEY

United States Patent Office 3,227,869
Patented Jan. 4, 1966

3,227,869
WARNING LIGHT CASING CONSTRUCTION
Sidney A. Heenan, Park Ridge, and John A. Biela, Chicago, Ill., assignors to Elastic Stop Nut Corporation of America, Union, N.J., a corporation of New Jersey
Filed Apr. 1, 1963, Ser. No. 269,307
8 Claims. (Cl. 240—11.2)

The present invention relates generally to warning light assemblies and pertains more specifically to a casing construction for such assemblies.

Where it is both necessary and desirable to warn of various hazards, particularly those arising out of construction work and especially along roads and highways, the display of flashing signal lights has been found to be quite effective. Warning light assemblies which are employed in these installations are themselves exposed to hazards inherent in such use and must withstand rough handling, accidental shocks and even vandalism, as well as the extremes imposed by weather conditions, during the course of their employment. Thus, it would be advantageous to have available a warning light assembly of such simple and inexpensive construction as to be practically expendable.

A particularly vexatious problem which has existed in the use of devices of this nature is the tendency for any shocks applied to the warning light assembly to cause a failure in the vicinity of the point of attachment of the casing construction to a supporting structure to which the casing is generally fixed at the site where a warning signal is displayed. Thus, casing assemblies have been susceptible to being damaged and actually torn from such supporting structures as a result of shocks received either accidentally or through vandalic acts.

An important object of the invention is to provide a warning light assembly simple enough to be economically fabricated and assembled of a minimum number of component parts of relatively inexpensive material, yet rugged enough to withstand the conditions to which such a device will be exposed.

Another object of the invention is to provide a warning light assembly so constructed as to be readily mounted on a support and when so mounted will offer maximum resistance to damage from both accidental shocks and acts of vandalism.

A further object of the invention is to provide a warning light casing construction having a casing component which is readily molded in the form of a unitary plastic structure possessing sufficient mechanical strength as well as a high degree of toughness, resiliency and corrosion resistance.

A still further object of the invention is to provide a warning light assembly having a lamp socket assembly mounted in a unitary casing component such that the socket assembly is oriented and secured therein in a simple and effective manner.

Briefly, the invention provides a warning light casing construction in which a lamp may be supported in a proper position relative to at least one lens. The casing construction is provided with a mounting structure for rigidly maintaining the casing upon a support, the mounting structure having a base for cooperatively engaging the support, structural means extending from the base toward points lying a substantial distance apart along the perimeter of the casing and away from the base and means integrally interconnecting the base and the structural means with the casing along the perimeter of the casing between the points for forming an integral reinforced structure between the base and the points so that stresses arising out of shocks received by the casing during its use upon the support will be borne by a substantial, reinforced portion of the casing rather than being concentrated at a limited area near the point of attachment of the casing to the support. The lamp and the lens are each maintained in place in the assembly by a unitary, molded casing component which incorporates the aforesaid reinforced structure between the base and the casing and which has a rim to which the lens may be secured and a socket holder integrally fixed to the rim for receiving and locating a socket assembly capable of retaining the lamp in a predetermined position. The socket assembly is located within an opening in the socket holder and has a lug which cooperates with a slot in the opening for orienting and securing the socket assembly within the socket holder in such a way that the filament of the lamp will be properly located with respect to the lens. The lug serves the multiple functions of properly orienting and retaining the socket assembly within the casing while completing an electrical connection to the lamp.

The novel features of the invention, as well as additional objects and advantages thereof, will be more fully understood from the following description of a preferred embodiment thereof, when read in conjunction with the accompanying drawings in which:

FIGURE 1 is a front elevational view, partially sectioned, of a warning light assembly illustrating novel features of a casing construction of the invention;

FIGURE 2 is an enlarged sectional view of the base of the casing construction of FIGURE 1;

FIGURE 3 is an enlarged sectional detail view taken along line 3—3 of FIGURE 1;

FIGURE 4 is a side elevational view, partially sectioned, of the assembly of FIGURE 1;

FIGURE 5 is a bottom plan view of the casing construction of the embodiment of FIGURE 1;

Figure 6:
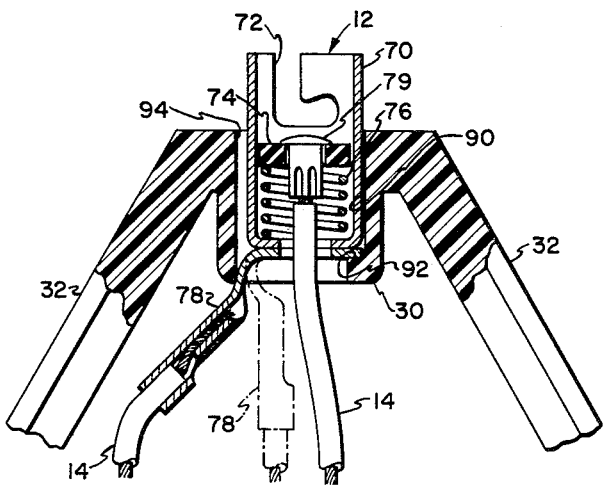
FIGURE 6 is an enlarged sectional view of a portion of FIGURE 1 illustrating the socket assembly details.

In FIGURE 1 a warning light assembly 1 is shown lying upon, but not yet rigidly fixed to, a supporting structure 2 having an aperture 4 therein for receiving the means by which the warning light assembly will be fixed to the support 2 which is located at the site where a warning signal is to be displayed. Generally, support 2 may be a part of a housing for containing means (not shown) for energizing the lamp 10 which is fixed in a socket assembly 12 and is electrically connected to such energizing means through insulated conductors 14 to provide a flashing visual signal.

In order to protect the lamp from the hazards imposed upon warning signal lights as a result of the conditions under which such lights must operate as explained hereinbefore, as well as enhance the visual signal obtained from the lamp itself, the lamp 10 is protectively encased within a casing construction 20. The light emanating from lamp 10 passes through a pair of lenses 22 in each face of the casing construction 20 (see FIGURE 4) to provide a bidirectional signal. It will be readily apparent that a monodirectional signal may be provided by replacing one of the lenses 22 with an opaque reflector so that all of the light from lamp 10 will be directed through the remaining lens. A generally annular rim 24 supports each lens 22 in proper position and has a reinforcing rib portion 26 (see FIGURES 1 and 3) integral with the inner circumference to add rigidity thereto, the lenses 22 being firmly fixed in the rim 24 by fastener means illustrated in the form of machine screws 28 which cooperate with threaded holes 29 in the rim.

The lamp 10 is accurately positioned relative to, and rigidly held in place between, the lenses 22 within socket assembly 12 which is fixed in a socket holder 30 in a manner which will be explained hereinafter in conjunction with FIGURES 6 and 7. The socket holder 30 is shown integrally connected to the rim 24 by means of bracket arms 32, each of which is shown lying along a radius of the annular rim (see FIGURE 1). Bracket arms 32 are preferably as slender as is practical, concomitant with sufficient strength, so that the even distribution of light from lamp 10 to the lenses 22 is not disrupted to any appreciable extent by the presence of these arms 32. Hence, more than one bracket arm is employed so as to gain the necessary strength both for the support of the lamp 10 and socket assembly 12 and for reinforcement of the rim 24 as will be explained hereinafter.

The casing construction 20 is provided with a mounting structure 40 integral with rim 24, the mounting structure having a flange 42 with a base portion 44 upon which the casing 20 rests when placed upon support 2 as illustrated in FIGURES 1 and 2. In this way a planar mounting surface is provided for matching the annular rim 24 to the planar support 2, the surface of the base portion 44 shown lying in a plane generally perpendicular to the plane of the rim (which is the plane of the paper in FIGURE 1). In order to firmly attach the casing 20 to the support 2, a fastener element, illustrated in the form of a hollow bolt 46 and a nut 47 is provided, the bolt 46 passing through an aperture 48 in the rim 24 and, in turn, allowing the conductors 14 to pass through the rim 24 and the support 2 when the bolt is passed through the aperture 4 of the support, the nut being subsequently threaded thereon (see FIGURE 2).

Ordinarily, shocks received by the warning light casing assembly during its use are transmitted through the casing construction to the point of attachment between the casing and the support causing a concentration of stresses in the vicinity of the base, and a tendency exists for the rim or the base to fail in this area if the stresses are of sufficient magnitude. In other words, the mounting base has been a generally weak point in warning light casing constructions and has been known to break from the rim when blows are received by the casing as a result of rough handling arising out of accidental blows or acts of vandalism.

The unique casing construction of the invention alleviates the above outlined difficulty through the employment of a structural arrangement which serves to reinforce the rim 24 along a substantial portion of the perimeter of the rim so that stresses arising out of shocks received by the casing will be borne by the extended reinforced structure and will not be concentrated at a relatively limited point of attachment, thereby reducing the tendency for failure of the rim or the base. To this end, the flange 42 of mounting structure 40 is provided with arms 50 which project outwardly from the base portion 44 (see FIGURE 5) and join the rim 24 at points A, the arms 50 constituting structural load bearing means shown lying in planes perpendicular to the plane of the rim and at an angle to the plane of the base portion 44. A web 52 integrally interconnects the flange arms 50 and the rim 24 (see FIGURES 1 and 3) thus providing a unitary, reinforced mounting structure between points A. Points A lie a substantial distance apart along the perimeter of rim 24 and away from base portion 44 and, as illustrated in FIGURE 1, the points define a segment which may extend along approximately ninety degrees of the perimeter, as opposed to ordinary casing mounting structures which do not extend very far from the fastening means and hence cover only a segment of a few degrees along the perimeter of the rim. Additional bracing is provided by bracket arms 32 and ribs 54 which add further stiffness to the rim between points A and enhance the load bearing characteristics of the mounting structure.

The employment of such a unitary configuration lends itself readily to fabrication in plastic by means of molding, the particular structural arrangement allowing a molded plastic structure to attain the mechanical strength required in such an application. Thus, the casing component which comprises the rim 24, the integral lamp mounting bracket arms 32 with socket holder 30 and the integral mounting structure 40 may be manufactured in one piece and is preferably molded in a unitary structure of a synthetic resin having the necessary degree of toughness, resiliency and corrosion resistance, as well as mechanical strength. Of those materials available, a thermoplastic acetal resin, known commercially as "Delrin," has been found to be quite suitable. Nylon, a generic term for certain synthetic thermoplastic polymeric resins, is also capable of being suitably employed. Other suitable materials will become apparent to those skilled in the materials art and the invention is not restricted to those specific materials mentioned above.

Referring now to FIGURES 1 and 2, the base is provided with a concave portion 60 (also see FIGURE 5) which is readily discernible when the casing construction 20 merely rests upon the support 2 with the base portion 44 of the mounting structure 40 lying against the surface of the support 2, and nut 47 has not yet been advanced along bolt 46 to firmly attach the casing to the support. However, as the nut 47 is tightened against support 2 and advances to the final position shown in FIGURE 4, the resilient nature of the mounting structure material allows portion 60 to resiliently flex toward the planar configuration shown in FIGURE 4 and provides a reaction force tending to increase the force with which the base grips the outer surface of support 2 and tending to maintain the nut firmly in place against the inner surface of the support. In this way a more rigid and secure attachment is assured.

Figure 7:
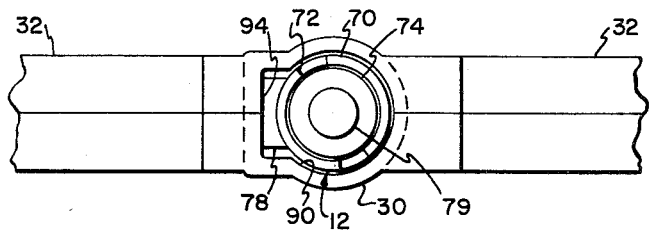
FIGURE 7 is an enlarged plan view of the socket assembly details.

As best seen in FIGURES 6 and 7, the socket assembly 12 is located and retained within the socket holder 30 in a simple, but effective manner and serves to locate the lamp 10 (which has been deleted from FIGURES 6 and 7 for clarity in these illustrations) accurately with respect to the lenses 22 while fulfilling the object of minimizing the number of component parts and providing an economical assembly. The socket assembly is made up of a ferrule 70 of an electrically conductive material, preferably a metallic sleeve, shown provided with slots 72 which form a "bayonet" type attachment for the lamp base, a wafer 74 of insulating material slidably received within the ferrule and resiliently urged upwardly by a helical spring 76, and an electrically conductive lug 78 fixed to the base of the ferrule, one of the conductors 14 being fixed to the lug 78 to make electrical contact with the perimeter of the lamp base while the other conductor 14 is connected to an electrical contact 79 which passes through the wafer 74 to be presented to the center contact of the lamp, the spring 76 assuring effective electrical contact.

It is important that the lamp 10 not only be located at a given point relative to the lenses, but that it be oriented within the socket assembly 12 as well so that the filament 80 of the lamp is properly presented to the lenses; that is, the length of the filament 80 should lie in the plane of the paper as seen in FIGURE 1 (and perpendicular to the plane of the paper as seen in FIGURE 4) so that the maximum amount of the light generated by the filament is presented to the lenses. In order to assure that the lamp is properly oriented with respect to the socket assembly, the socket assembly is provided with means for allowing the lamp base to be fixed therein at only the proper orientation. The "bayonet" type attachment is a conventional means for securing and orienting a lamp base in a socket assembly, the slots 72 cooperating with pins 82 (see FIGURE 1) on the lamp base to fix the predetermined position in a well-known manner.

In fixing the socket assembly within the warning light assembly, the ferrule 70 is received within a largely cylindrical opening 90 formed in the socket holder 30, and rests upon a shoulder 92 provided at the bottom end of the socket holder, thus serving to locate the socket assembly, and consequently the lamp, in a proper position relative to the lenses 22. In order to orient and retain the socket assembly 12 within the socket holder 30, a slot 94 is provided contiguous with the opening 90 and receives a portion of the lug 78 which is bent from an initial position illustrated in phantom in FIGURE 6, to a final position as shown, in which final position the lug engages the walls of the slot 94 and the bottom end of the socket holder so that the socket assembly is firmly seated within the opening 90 against the shoulder 92 and cannot be rotated therein, as for example when the lamp is inserted or removed. Note that the lug 78 originally projects in a direction parallel to the axis of the ferrule 70 so that the socket assembly is readily inserted into the opening through the top end of the socket holder and then the lug is bent to the angle shown so as to secure the socket assembly therein. Hence, the lug serves the multiple functions of properly orienting and retaining the socket assembly within the socket holder while completing an electrical connection to the lamp base, thus helping to minimize the number and complexity of the components of the warning light assembly.

It is to be understood that the above detailed description of a preferred embodiment of the invention is provided by way of example only and is not intended to restrict the invention. Various details of design and construction may be modified without departing from the true spirit and scope of the invention as defined in the appended claims.

We claim:
1. In a warning light casing construction having a unitary, molded rim supporting at least one lens and means supporting a lamp in proper relation with the lens, said rim lying in a vertical plane, a mounting structure integrally molded with the rim for rigidly fixing the rim to a support lying in a horizontal plane, said mounting structure comprising:
 (A) a flange including
  (1) a base integral with the flange and having a portion lying in a plane perpendicular to said vertical plane, and
  (2) arms integral with and extending from said base toward said rim in planes perpendicular to said vertical plane, each said plane lying at an angle to the plane of said base portion such that said arms meet said rim at points lying a substantial distance apart along the perimeter of the rim and away from said base; and
 (B) a web molded integrally with the flange and interconnecting said base and said arms with said rim along the perimeter of the rim between said points for forming a reinforced structure between said base and the portion of said rim lying between said points.

2. In a warning light casing construction having a rim supporting at least one lens and means supporting a lamp in proper relation with the lens, said rim lying in a vertical plane, a mounting structure for rigidly fixing the rim to a support lying in a horizontal plane, said mounting structure comprising:
 (A) a flange including
  (1) a base having a portion lying in a plane perpendicular to said vertical plane, and
  (2) arms extending from said base toward said rim in planes perpendicular to said vertical plane, each said plane lying at an angle to the plane of said base portion such that said arms meet said rim at points lying a substantial distance apart along the perimeter of the rim and away from said base;
 (B) a web integrally interconnecting said base and said arms with said rim along the perimeter of the rim between said points for forming a reinforced structure between said base and the portion of said rim lying between said points; and
 (C) a fastener element passing through said rim and said base for fixing said base to said support;
 (D) said base having a concave portion capable of resiliently resisting flexing toward a planar configuration when said base is drawn against said support by said fastener element to establish a reactive force against the support tending to increase the force with which the base portion grips said support and increasing the effectiveness of said fastener element in rigidly securing said base to said support.

3. A unitary, molded casing component for use in a warning light assembly having a lamp and a casing construction including at least one lens and means for rigidly fixing said casing construction to a support, said casing component comprising:
 (A) a rim for supporting and securing the lens in the assembly;
 (B) means integral with said rim for supporting the lamp in proper relation to the lens;
 (C) a base for cooperatively engaging said support;
 (D) structural means extending from said base toward points lying a substantial distance apart on the perimeter of said rim and away from said base; and
 (E) means integrally interconnecting said base and said structural means with said rim along the perimeter of the rim between said points for forming a reinforced integral structure between said base and the portion of said rim lying between said points;
 (F) said lamp supporting means being integrally fixed to said rim between said points for adding further load bearing strength to the portion of said rim lying between said points.

4. A unitary, molded casing component for use in a warning light assembly having a lamp and a casing construction with at least one lens and means for rigidly fixing said casing construction to a planar support, said casing component comprising:
 (A) an annular rim for supporting and securing the lens in the assembly;
 (B) a socket holder for supporting the lamp in proper position relative to the lens;
 (C) a planar base for cooperatively engaging the support;
 (D) arms extending from said base toward said rim to meet said rim at points lying a substantial distance apart on the perimeter of said rim and away from said base;
 (E) a web integrally interconnecting said base and said arms with said rim along the perimeter of the rim between said points for forming a reinforced integral structure between said base and the portion of said rim lying between said points; and
 (F) bracket arms radiating from said socket holder and integrally fixed within said rim at positions lying between said points for maintaining said lamp in said proper position and for adding further load bearing strength to the portion of said rim lying between said points.

5. In a warning light assembly having at least one lens, a lamp in proper position relative to the lens and means for securing said assembly to a planar support, a casing construction comprising:
 (A) a socket assembly for retaining the lamp in a fixed, predetermined position, said socket assembly having a base and a lug fixed thereto for completing an electrical connection to the lamp, and projecting from said base; and,
 (B) a unitary, molded casing component having
  (1) an annular rim for supporting and securing the lens in the assembly,
  (2) a planar base for cooperatively engaging the support, (3) structural means extending from said base toward points lying a substantial distance apart on the perimeter of said rim and away from said base,
(4) means integrally interconnecting said base and said structural means with said rim along the perimeter of the rim between said points for forming a reinforced integral structure between said base and the portion of said rim lying between said points,
(5) a socket holder having an opening from end to end thereof for receiving said socket assembly, a slot contiguous with said opening and a shoulder projecting into said opening adjacent one of said ends, and
(6) bracket arms radiating from said socket holder and integrally fixed within said rim at positions lying between said points for adding further load bearing strength to the portion of said rim lying between said points and for supporting said socket holder adjacent the center of said rim;
(C) said socket assembly lying within said opening with said base being seated upon said shoulder to locate said lamp in said proper position when the lamp is fixed within said socket assembly, said lug projecting into said slot and engaging said socket holder for orienting and retaining said socket assembly within said opening.

6. In a warning light assembly having at least one lens, a lamp in proper position relative to the lens and means for securing said assembly to a support, a casing construction comprising:
(A) a socket assembly for retaining the lamp in a predetermined position, said socket assembly having a lug projecting therefrom for completing an electrical connection to said lamp; and
(B) a unitary, molded casing component having
(1) a rim for supporting and securing the lens in the assembly,
(2) a base for cooperatively engaging the support,
(3) a reinforced integral structure between said base and a portion of said rim lying between points located a substantial distance apart on the perimeter of the rim and away from said base,
(4) a socket holder having a slotted opening therein for receiving said socket assembly, and
(5) means for integrally fixing said socket holder to said rim between said points and for adding further load bearing strength to the portion of said rim lying between said points, said means supporting said socket holder in position for locating the lamp in said proper position when the lamp is fixed within said socket assembly, the socket assembly being located within said opening with said lug cooperating with said slotted opening for orienting and retaining said socket assembly within said socket holder.

7. In a warning light casing construction having a rim for supporting at least one lens and a mounting structure for rigidly fixing the rim to a support, means for supporting a lamp in proper position relative to the lens, said means comprising:
(A) a socket holder having a top and a bottom;
(B) means for integrally interconnecting said socket holder with the rim;
(C) a slotted opening extending from said top through said bottom within said socket holder said slotted opening including a first portion of circular cross-section and an adjacent second portion of non-circular cross-section on one side thereof;
(D) a socket assembly seated within said slotted opening and capable of receiving said lamp in a predetermined position; and
(E) a lug fixed at the base of said socket assembly for completing an electrical connection to said lamp, said lug being substantially the same size and shape as said second portion of said slotted opening and being disposed within said second portion and engaging said bottom, said lug thereby providing means for orienting and securing said socket assembly against rotation within and removal from said opening.

8. In a warning light casing construction having an annular rim for supporting at least one lens and a mounting structure for rigidly fixing the rim to a support, means for supporting a lamp in proper position relative to the lens said means comprising:
(A) a socket holder having top and bottom ends;
(B) relatively slender bracket arms radiating from said socket holder and integrally fixed within the rim to locate said top end adjacent the center of said rim;
(C) a cylindrical opening within said socket holder extending from end to end thereof;
(D) a shoulder projecting into said opening at said bottom end;
(E) a slot contiguous with said opening and extending at least through the bottom end of said socket holder; and
(F) a socket assembly having
(1) a ferrule capable of retaining said lamp in a predetermined position,
(2) a base, and
(3) a lug fixed to said base and electrically connected to said lamp when said lamp is in position in said ferrule;
(G) said socket assembly being seated within said opening located upon said shoulder with at least a portion of said lug projecting into said slot and cooperating with said slot and said bottom end to orient said socket assembly in position to present said lamp in proper relation to said lens and secure said socket assembly against rotation within and removal from said opening.

References Cited by the Examiner
UNITED STATES PATENTS

| 1,851,335 | 3/1932 | Taliaferro | 240—11.2 |
|---|---|---|---|
| Re. 23,193 | 1/1950 | Packer et al. | 240—11.2 X |
| 2,538,655 | 1/1951 | Preston | 240—52 |
| 2,739,224 | 3/1956 | Knapp | 240—8.22 |
| 2,860,233 | 11/1958 | Johnson | 240—7.1 |
| 2,994,059 | 7/1961 | Dahlgren et al. | 339—188 |
| 3,102,616 | 9/1963 | Simpkins | 189—36 |
| 3,114,182 | 12/1963 | Trautner et al. | 240—90 |

NORTON ANSHER, *Primary Examiner.*